United States Patent [19]
Velimirovic

[11] Patent Number: 5,292,105
[45] Date of Patent: Mar. 8, 1994

[54] KNIFEGATE VALVE

[75] Inventor: Goran Velimirovic, Nowra, Australia

[73] Assignee: Keystone International Holdings Corp., Houston, Tex.

[21] Appl. No.: 30,144

[22] PCT Filed: Jun. 7, 1991

[86] PCT No.: PCT/US91/04032
 § 371 Date: Feb. 26, 1993
 § 102(e) Date: Feb. 26, 1993

[87] PCT Pub. No.: WO91/19122
 PCT Pub. Date: Dec. 12, 1991

[51] Int. Cl.$^5$ .............................................. F16K 3/02
[52] U.S. Cl. .................................. 251/214; 251/329
[58] Field of Search .............................. 251/214, 329

[56] References Cited

U.S. PATENT DOCUMENTS 3,000,608 9/1961 Williams.

FOREIGN PATENT DOCUMENTS 121763 7/1959 New Zealand.
119617 9/1959 New Zealand.

*Primary Examiner*—John C. Fox
*Attorney, Agent, or Firm*—Browning, Bushman, Anderson & Brookhart

[57] ABSTRACT

The present invention provides an improved knifegate valve 1, comprising a body 3, a knifegate 2, a gland box 4, an actuator 9, 10, 11 for inserting the knifegate 2 through the gland box 4 into the valve body 3 and retracting it therefrom, a support 5,6 for supporting the actuator 9, 10, 11 in spaced relation to the gland box 4 and the body 3 and a securing device 20 for securing the gland box 4 in such a way that it is capable of retaining packing material 17 contained therein in a compressed state, wherein the improvement comprises connecting the securing device 6 to the support 5. The support may comprise a bridge 5 supported in spaced relation to the body 3 by pillars 6 connected to the body 3, in which case the securing device may comprise nuts 20 that are capable of cooperating with corresponding external threads on the pillars 6 to secure the gland box lid 14 to its base 13. The actuator may comprise a hand wheel 9 having a central threaded bore 10 and a corresponding spindle 11 connected to the knifegate 2. The knifegate 2 may also be pneumatically actuated or actuated by a solenoid. Alternatively the knifegate may be connected to a piston that is lever operated.

6 Claims, 1 Drawing Sheet

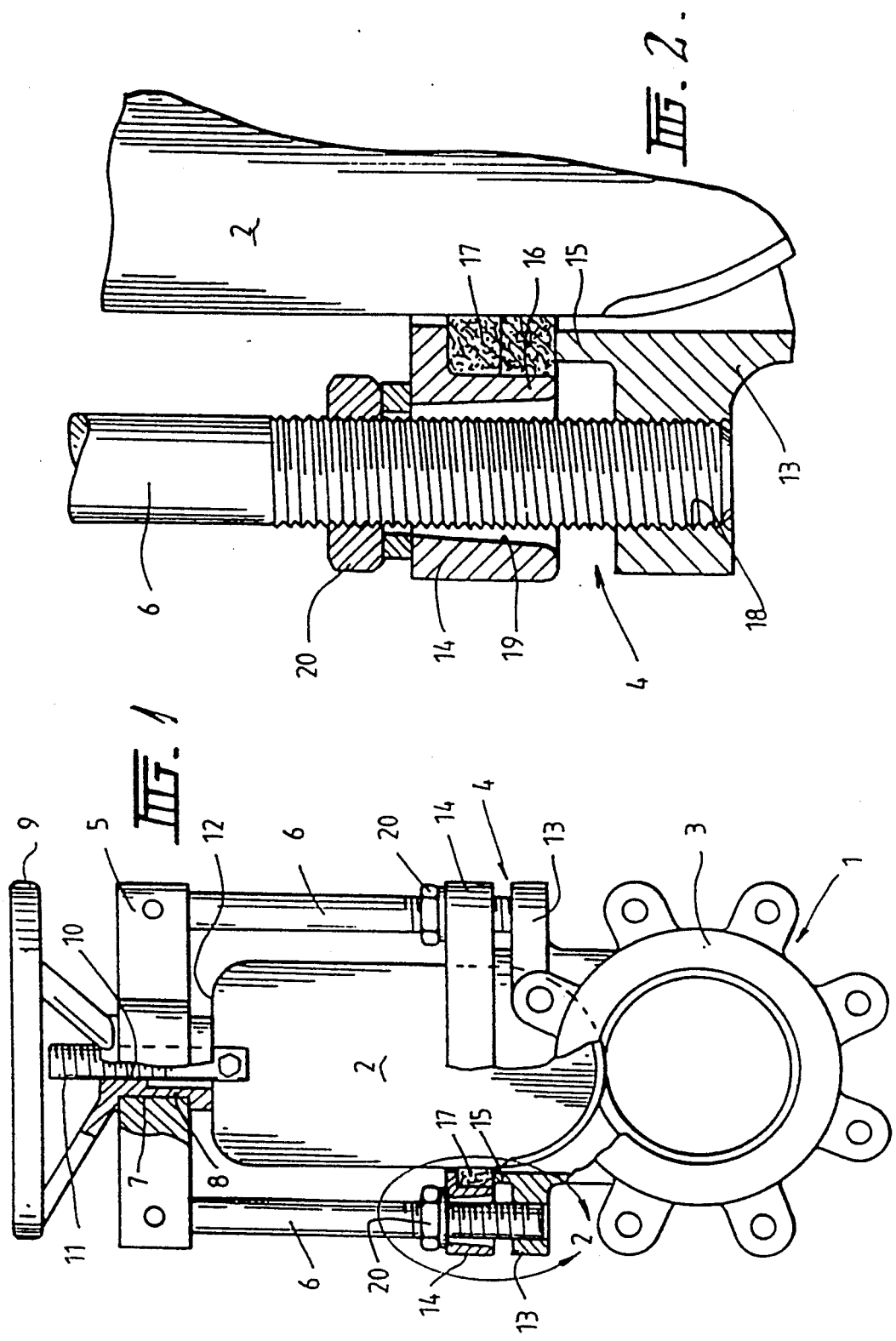

KNIFEGATE VALVE

The present invention relates to knifegate valves.

Knifegate valves comprise a body, a knifegate, a gland box, actuating means for inserting the knifegate into the valve body and retracting it therefrom and support means for supporting the actuating means in spaced relation to the gland box and the body.

The gland box normally comprises a rectangular container having a lid containing a slot therein through which the knifegate is capable of passing. The side of the gland box opposite to the lid has a corresponding slot. The gland box is packed with a compressible material that is capable when compressed of forming a seal around faces and edges of the knifegate that passes through the gland box. The lid of the gland box is secured to the body usually by means of bolts in order to compressibly retain the packing within the gland box so that it forms an effective seal around the faces and edges of the knifegate.

It has now been discovered that the cost of producing such knifegate valves can be reduced by combining the functions of the actuator support means and the gland box securing means.

Accordingly the present invention provide an improved knifegate valve, the knifegate valve comprising:

a body, a knifegate, a gland box, actuating means for inserting the knifegate through the gland box into the valve body and retracting it therefrom, support means for supporting the actuating means in spaced relation to the gland box and the body and securing means for securing the gland box in such a way that it is capable of retaining packing contained therein in a compressed state, wherein the improvement comprises connecting the securing means to the support means.

The support means may comprise a bridge supported in spaced relation to the body by pillars connected to the body in which case the securing means may comprise nuts that are capable of cooperating with corresponding external threads on the pillars to secure the gland box lid to its base.

The actuating means may comprise a hand wheel having a central threaded bore and a corresponding spindle connected to the knifegate. The knifegate may also be pneumatically actuated or actuated by a solenoid. Alternatively the knifegate may be connected to a piston that is lever operated.

The body of the valve may be v-ported in order to provide for metering as well as providing greater control.

Knifegate valves find a broad array of applications in systems where it is necessary to control the flow rate of fluids within the system. Knifegate valves offer considerable control over the rate of flow of fluid through the valve since they are capable of operating anywhere between full bore and total closure. Industries in which knifegate valves are commonly used are the food and beverage processing industries, the pulp and paper stock industries and mineral processing industries. Typically a hand operable knifegate valve will have a body with a bore having an internal diameter in the range between 50 mm and 300 mm.

The packing preferably comprises polytetrafluorethylene-filled synthetic yarn. Packing of this type is suitable for use with liquids having a pH in the range between 4 and 10 and for temperatures up to 260° C.

An embodiment of the invention will now be described with reference to the accompanying drawings in which FIG. 1 is a side elevation partially in cross-section of a knifegate valve according to the invention and FIG. 2 is an enlarged side elevation showing part of the knifegate depicted in FIG. 1.

FIG. 1 illustrates a knifegate valve 1 comprising a knifegate 2, a body 3 and a gland box 4. The valve has a bridge 5 supported in spaced relation to the body 3 by pillars 6. The bridge 5 has a central bore 7 for retaining the neck 8 of a hand wheel 9. The neck 8 has a centrally located threaded bore 10 through which a spindle 11 having cooperating external threads passes. The spindle 11 is connected to end 12 of the knifegate 2.

The gland box 4 comprises a base 13 integrally formed with the body 3 and a lid 14. The base has a peripheral flange 15 which has an external dimension that is slightly less than the internal dimension of a corresponding peripheral flange 16 attached to the lid. The lid and base in cooperation with the peripheral flanges define a space therebetween which is capable of being filled by a compressible packing material 17.

The base 13 has peripheral bores 18 for securing the bases of pillars 6.

Preferably the bore 18 is threaded and cooperates with external threading on the base of the pillar to secure the pillar within the bore. The lid 14 has peripheral bores 19 through which the pillar 6 can pass. The bases of the pillars 6 are externally threaded so that they can cooperate with pillar nuts 20 to secure the lid of the gland box to the base thereby compressively retaining the packing material 17 within the gland box.

The gland box is provided with slots (not shown) in its lid and base through which the knifegate 2 is capable of passing.

In operation, the hand wheel of the valve is turned thereby causing the spindle 11 to move towards or away from the body 3 depending upon the direction of rotation. Movement of the spindle causes the knifegate 2 to move correspondingly towards or away from the body through the slot in the gland box 4. The packing 17 contained in the gland box is compressed against the faces and edges of the knifegate 2 to form an effective seal against egress of fluid from the body through the slot.

The embodiment of the valve depicted may be assembled by screwing the externally threaded bases of the pillars 6 into the internally threaded bores 18 of the base 13 of the gland box 4. The lid 14 of the gland box is then placed in position by inserting the free ends of the pillars 6 through the peripheral bores 19 in the gland box lid. Packing is placed inside the gland box and the lid is secured in position by means of the pillar nuts 20. The knifegate is inserted through the slots in the gland box, the bridge connected to the free ends of the pillars 6, the spindle connected to the knifegate 2 through the bore 7 in the bridge and the hand wheel placed over the free end of the spindle and rotated in a direction to bring it into contact with the bridge 5.

I claim:

1. A knifegate valve, comprising:

a valve body, a knifegate valve element, a gland box connected to said valve body, packing disposed in said gland box for sealing against said valve element, actuating means for effecting reciprocal movement of said valve element into and out of said valve body through said gland box, support means for supporting said actuating means in spaced relationship to said gland box and said valve body, and securing means carried on said support means for retaining said packing in a compressed state in response to movement of said securing means along said support means.

2. The knifegate valve of claim 1 wherein said support means is connected to said gland box.

3. The knifegate valve of claim 2 wherein said gland box comprises a base and lid, and said support means comprises a plurality of pillars, each said pillar having a first end and a second end, each said first end connected to said base of said gland box and each said second end connected to a bridge for holding said actuating means.

4. The knifegate valve of claim 3 wherein said pillars are cylindrical rods.

5. The knifegate valve of claim 3 wherein at least two of said pillars are threaded along at least a portion of their length and said securing means comprises a plurality of nuts, one said nut disposed about each said threaded pillar at said threaded portion for urging said lid toward said base of said gland box.

6. The knifegate valve of claim 3 wherein said pillars pass through said lid of said gland box.

* * * * *